United States Patent [19]
Ficker

[11] 3,873,474
[45] Mar. 25, 1975

[54] REGENERATION OF POLYMERIC MATERIAL

[76] Inventor: Stefan Ficker, Postfach 1150, 6074 Urberach, Germany

[22] Filed: Apr. 17, 1972

[21] Appl. No.: 244,749

[52] U.S. Cl.................. 260/2.3, 259/192, 260/710, 260/720
[51] Int. Cl........................ C08d 13/38, C08c 17/38
[58] Field of Search..................... 260/2.3, 710, 720

[56] References Cited
UNITED STATES PATENTS

| | | | |
|---|---|---|---|
| 2,494,593 | 1/1950 | Sverdrup | 260/720 |
| 2,653,916 | 9/1953 | Elgin et al. | 260/2.3 |
| 2,800,462 | 7/1957 | Sverdrup | 260/720 |

FOREIGN PATENTS OR APPLICATIONS

| | | | |
|---|---|---|---|
| 1,148,008 | 4/1969 | United Kingdom | 260/2.3 |

OTHER PUBLICATIONS
"A Method for the Continuous Processing of Reclaimed Rubber" Rubber Age, July 1954, Page 548.

*Primary Examiner*—Wibert J. Briggs, Sr.
*Attorney, Agent, or Firm*—Karl F. Ross; Herbert Dubno

[57] ABSTRACT

Polymeric scrap material, such as rubber from used vehicular tires, is reclaimed by comminuting the scrap and then advancing it under substantially atmospheric pressure through a heating chamber with the aid of two or more heated feed screws having interleaved threads, one screw rotating at half the speed of its neighbor and having a double thread with twice the pitch of the single thread of the latter. Residence time in the heating chamber may range between 3 and 30 minutes, at operating temperatures of 140° to 300°C. By relatively accelerating or retarding one of two adjoining screws, their interleaved threads are moved into a nearly contacting relationship in which they scrape adhering incrustations from each other.

4 Claims, 4 Drawing Figures

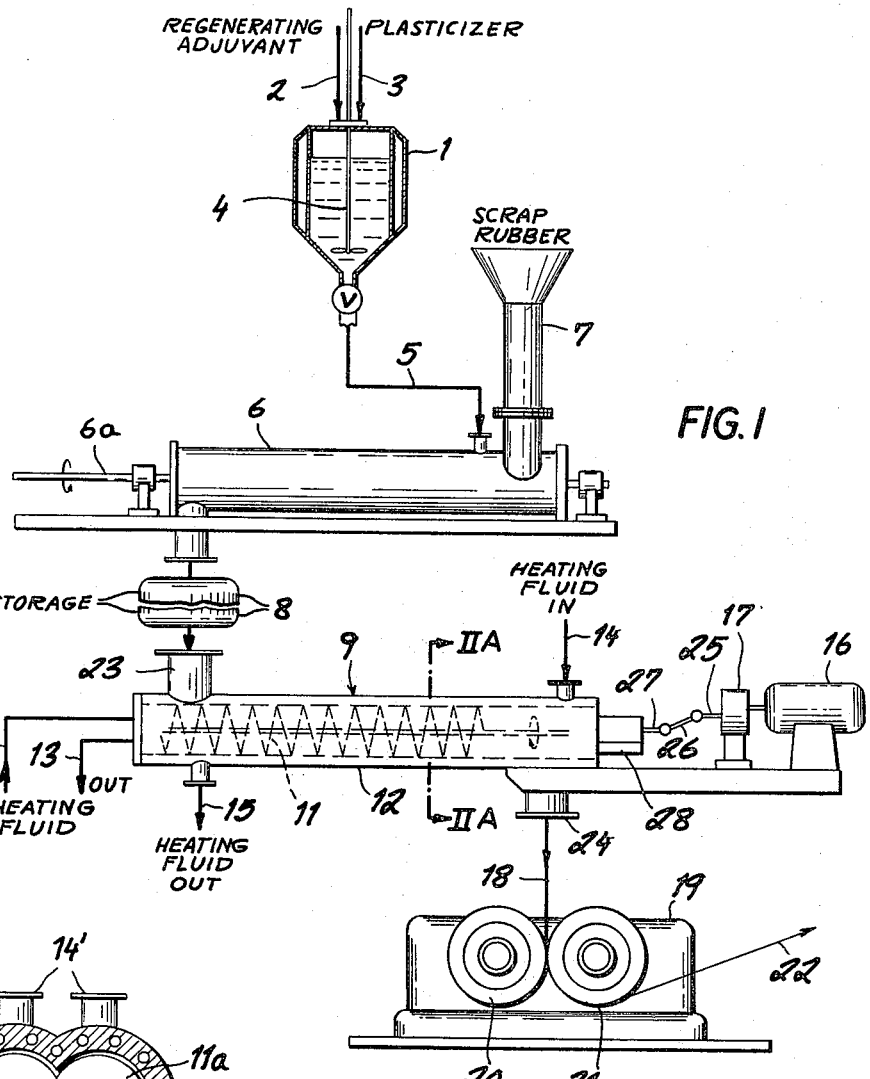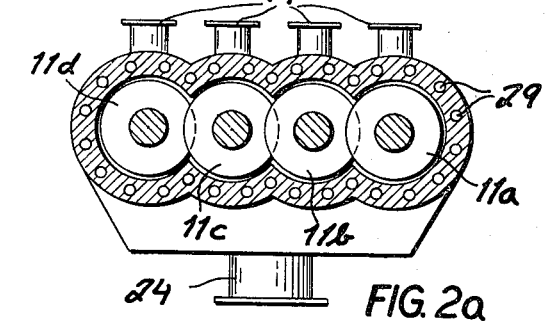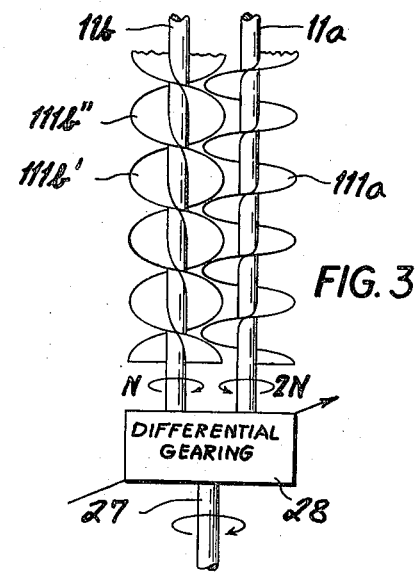

REGENERATION OF POLYMERIC MATERIAL

My present invention relates to a method of and means for continuously regenerating polymeric material, including vulcanized natural or synthetic rubber, with the aid of a heating chamber into which the material is introduced in comminuted form and in which it is regenerated by prolonged exposure to high temperature.

In the reclaiming of natural or synthetic rubber from used vehicular tires, for example, it is known to grind the scrap rubber to a particle size of less than 0.5 mm and, thereafter, to masticate the comminuted mass in an extruder in which it is mixed with a regenerating adjuvant under considerable pressure, the necessary heat being supplied in part by external means and in part by the internal friction. Variations in the pitch of the threads of the extruder screw result in alternate compression and expansion of the mass to intensify the heating effect.

Systems of this nature, while advantageous from the viewpoint of continuous operation, do not generally yield as good a product as the conventional batch processes wherein the scrap is decomposed (e.g. in an alkaline medium) with the aid of steam. Also, the equipment used for this purpose is subject to rapid wear on account of its prolonged exposure to high pressures and temperatures. Furthermore, the extrusion screws are difficult to clean and tend to become encrusted with scorched particles, especially at the points of extended contact between the metal of the screw threads and the material to be masticated.

The general object of my present invention is to provide a method of and means for regenerating used rubber and other polymeric scrap in a manner avoiding the aforestated disadvantage.

A more particular object is to provide a method of regeneration resulting in an improved product which at least in some respects may equal or even surpass the quality of the virgin polymer.

I have found, in accordance with the present invention, that these objects can be realized by continuously feeding comminuted scrap material through an elongate heating chamber between the threads of two or more screws, which are spacedly interleaved and rotate in mutually opposite directions, the chamber having a substantially nonrestrictive outlet so that the advancing material is practically under atmospheric pressure. The necessary heat is supplied at least to a major extent by a hot fluid circulating through the hollow feed screws, preferably a liquid having virtually no vapor pressure at the operating temperature. This operating temperature may range between about 140° and 300° C, advantageously between 240° and 280° C, with residence times between 3 and 30 minutes. Silicone oils are suitable as high-boiling heating fluids for use at these temperatures.

According to a more particular feature of my invention, the relative speed of adjoining screws is changed from time to time so that their threads almost contact each other momentarily, thereby scraping possible incrustations from their surfaces. By alternately advancing and retarding one screw with reference to its mate, both the front and back surfaces of the threads get scraped.

An especially desirable construction of a pair of feed screws with nearly meshing threads comprises a first screw of constant pitch and a second screw of $n$ times that pitch, with the former turning $n$ times as fast as the latter; the threads of the second screw advantageously form $n$ times as many interleaved helices as those of the first screw, so that the actual thread spacing is the same for both screws. Because of the difference in pitch angle, the two sets of thread approach one another in their scraping position only along narrow zones so as to minimize the risk of jamming. In a preferred case, $n = 2$.

If desired, a supplemental flow of heating fluid may be conducted through the walls of the housing forming the chamber, this housing being preferably constricted in the region of overlap of the interleaved screw threads so that its contour substantially follows the outline of the screw profile. More than two feed screws may be disposed side by side in the same nearly meshing relationship within a common housing.

The system just described delivers usable polymeric material, in rod or sheet form, after passage through one or more refining stages such as extruders or calenders. Particularly in the case of scrap material consisting of vulcanized natural or synthetic rubber, the admixture of a vulcanization promoter and a plasticizer with the scrap prior to its introduction into the heating chamber is recommended to improve the qualities of the reclaimed material. The presence of substantial amounts of oxygen in the particulate mass within the chamber has a depolymerizing effect at the temperatures employed which generally lie above the vulcanization point.

Of the various softeners commercially available and suitable for this treatment, a highly aromatic mineral oil known as Naftolen ZD has been found especially effective. This compound has a mean molecular weight of 320 and a specific weight of about 1.02; its aniline point is around +12°C. Its viscosity/density constant (VDK), as per ASTM D44b, is 0.97 Saybolt seconds.

Among the various available vulcanization promoters I may mention a mixture of dixylyldisulfides, with a density of $1.12 \pm 0.02$, known as Renacit VI N.

The above and other features of the invention will be described in detail hereinafter with reference to the accompanying drawing in which:

FIG. 1 is a flow diagram of a system for regenerating scrap material in accordance with my invention;

FIG. 2a is a cross-sectional view, taken on the line IIA — IIA of FIG. 1, through a heating chamber forming part of the system;

FIG. 2b is similar to FIG. 2a, showing a modified heating chamber; and

FIG. 3 is a somewhat diagrammatical view of a pair of coacting feed screws disposed in the heating chamber of FIG. 2b.

The system shown in FIG. 1 includes a heated mixing vessel 1 to which a vulcanization promoter and a plasticizer are continuously supplied at controlled rates through respective conduits 2 and 3. These components, thoroughly blended by means of an agitator 4, are introduced via a conduit 5 into a mixing chamber 6 with stirrer 6a also receiving finely comminuted scrap rubber through a hopper 7. The resulting mixture is then retained for several hours in a storage tank 8 from which it is continuously discharged into an inlet 23 of a heating chamber 9 provided, at its end remote from the inlet, with a substantially nonrestrictive outlet 24. Chamber 9 contains a plurality of juxtaposed feed screws, generally designated 11 in FIG. 1, that are driven by a motor 16 via reduction gearing 17 which preferably is continuously adjustable and whose output shaft 25 is connected by a universally jointed link 26 with an input shaft 27 of a differential gear 28 of the planetary type. Feed screws 11 are hollow and are continuously traversed by a heating fluid entering at 14 and exiting at 15, the fluid thus passing in counterflow to the comminuted mass moving within chamber 9. Another branch of the fluid-circulation path is formed by passages 29 within the wall 12 of the housing of chamber 9, the fluid entering some of these passages through a first manifold at 10 and leaving the remaining passages through a second manifold at 13; these passages are all interconnected at the outlet end of the chamber by a common channel not shown.

The regenerated material exiting from outlet 24 of chamber 9 is fed at 18 into the nip of a pair of counter-rotating, water-cooled pressure rollers 20, 21 of a refining stage serving to homogenize and consolidate the material into a continuous sheet 22 of reclaimed rubber.

FIG. 2a shows a set of four juxtaposed feed screws 11a, 11b, 11c, 11d with interleaved threads overlapping in regions in which housing wall 12 forms constrictions to follow the contour of the screw profile. Thus, only a narrow space 30 of substantially constant width, heated to a virtually uniform temperature, remains between the housing wall and the periphery of the screw threads.

FIG. 2b illustrates a modified assembly with only two screws 11a, 11b in a housing 12' having inlets 14' for the admission of heating fluid to these screws and an outlet 24' for the discharge of the regenerated mass. Screws 11a, 11b have been illustrated in greater detail in FIG. 3 which shows the former as provided with a single helical thread 111a and the latter as having two interleaved helical threads 111b', 111b'' of twice the pitch of thread 111a. As further illustrated in FIG. 3, differential gear 28 normally rotates the screw 11a at a speed 2N and the other screw 11b at a speed N of half that magnitude whereby the interleaved thread portions maintain a constant distance from one another. Differential gear 28 can be manually controlled to vary, temporarily, the relative speed of these screws so that thread 111a advances or lags with reference to threads 111b', 111b'' until the overlapping thread edges nearly touch, thereby scraping any adhering residue from the operative thread surfaces.

As will be readily understood, such speed control can be obtained by slightly braking one or the other output shaft of the differential gear.

In the assembly of FIG. 2a, screws 11c and 11d may be identical with screws 11a, 11b, respectively, and may be driven at their respective speeds.

The system just described can be operated with a variety of polymeric materials having particle sizes up to about 3 mm. The mixture entering into the chamber 9 may be preheated in tank 8 to about 60°C, in which case the operating temperature within chamber 9 need not range above substantially 200°C. If the material is not preheated, operating temperatures between 180° and 300° C are usually required, the preferred range being 240° to 280° C. The material may reside in chamber 9 up to about half an hour, preferably between approximately 5 and 25 minutes.

EXAMPLE I

The comminuted scrap material delivered directly into inlet 23 consisted of about 96% (by weight) of vulcanized butyl rubber, the remainder being fibrous material; 95% of the particles had a size of 2 mm or less. Components 4 – 8 were not used. This material was introduced into chamber 9 at a temperature of 15°C, the chamber being filled substantially 100% at the start of operations.

Silicone oil heated to about 235°C was circulated through the screws and the housing, with maintenance of a working temperature of about 223° to 230°C in the chamber; the temperature drop along the path of conveyance was about 8° to 10°C. Each screw had a length of 3.9 m and an outer thread diameter of 356 mm; its thermally effective surface was 13.5 $m^2$. The residence time of the material in the chamber was about 13 minutes, the resulting throughput being 340 kg/hr. The pitch of the threads 111a was 92 mm, their depth about 100 mm; speed N was 3 RPM.

The material issuing from the outlet 24 at a temperature of 210°C was compressed to a sheet of a thickness of 0.5 mm with simultaneously cooling to 60°C. After calendering, the sheet had a perfectly smooth surface and could be wound up into a roll.

EXAMPLE II

Comminuted vulcanized synthetic styrene-butadiene rubber was blended in mixer 6 with 6% (by weight) of a plasticizer (Naftolen ZD) and 0.3% of a vulcanization promoter (Renacit VI N). The screw temperature at the entrance end varied between 195° and 202°C, with an 8° drop along the chamber, the residence time being 12½ minutes; with a speed N of 1.5 RPM, the throughput amounted to 355 kg/hr.

The reclaimed material, after three refining steps in extruders or between pressure rollers as illustrated at 19, had the following properties:

| | |
|---|---|
| Specific weight | 1.184 |
| Tensile strength | 119 kg/cm |
| Elongation upon rupture | 310% |
| Elasticity | 34% |
| Hardness | 56 (Shore) |
| Impact resistance (elongation) | 169% |
| Impact resistance (pressure) | 60 kp |
| Deformation at 80°C under 2,150g according to ASTM D621: | |
| compression | 60% |
| recovery | 46% |
| Module of elasticity (300% elongation) | 114 kp/$cm^2$ |

The system herein disclosed has been successfully used with cast feed screws which were not machined and, therefore, had relatively rough surfaces. During normal operation, the clearance maintained therebetween may vary between about 1 and 5 mm in shifting from scraping to normal operation.

If desired, one of the screws (e.g. 11a in FIG. 3) may be continuously driven at constant speed, only the other screw being rotated from the common drive shaft through a summing differential.

I claim:

1. A method of continuously regenerating previously vulcanized rubber scrap, comprising the steps of:
   a. comminuting the scrap to be regenerated;
   b. introducing the comminuted scrap into an elongate heating chamber;

c. maintaining said chamber at an operating temperature of 140° to 300°C;
d. advancing said scrap material through said chamber rotating feed screws with spacedly interleaved threads at substantially atmospheric pressure for a residence time of 3 to 30 minutes, said interleaved threads differing in pitch and said screws are being rotated with a compensatory difference in speed;
e. intermittently varying the relative speed of said screws for scraping adhering incrustations off the threads thereof;
f. continuously discharging said scrap from said chamber through a nonrestrictive outlet; and
g. homogenizing and consolidating the material issuing from said outlet.

2. A method as defined in claim 1 wherein said operating temperature ranges between substantially 240° and 280°C.

3. A method as defined in claim 1, further comprising the step of admixing a plasticizer and a vulcanization promoter with said scrap material prior to introduction thereof into said chamber.

4. A method as defined in claim 1 wherein said chamber is heated at least in part by passing through said screws a heating liquid having substantially no vapor pressure at an operating temperature of about 180° to 300°C.

* * * * *